INVENTORS
LUTHER W. BAHNEY
ALFRED H. HORSWELL

Jan. 10, 1950     L. W. BAHNEY ET AL     2,494,501
SUBMERGED RESISTOR INDUCTION FURNACE

Filed May 3, 1946     5 Sheets-Sheet 3

INVENTORS
LUTHER W. BAHNEY
ALFRED H HORSWELL
BY
ATTORNEYS

Jan. 10, 1950 L. W. BAHNEY ET AL 2,494,501
SUBMERGED RESISTOR INDUCTION FURNACE
Filed May 3, 1946 5 Sheets-Sheet 4

INVENTORS
LUTHER W. BAHNEY
ALFRED H. HORSWELL
BY
Emery Varney Whitmore & Dys
ATTORNEYS Jan. 10, 1950  L. W. BAHNEY ET AL  2,494,501
SUBMERGED RESISTOR INDUCTION FURNACE
Filed May 3, 1946  5 Sheets-Sheet 5

INVENTORS
LUTHER W. BAHNEY
ALFRED H. HORSWELL
BY
ATTORNEYS

Patented Jan. 10, 1950

2,494,501

UNITED STATES PATENT OFFICE 2,494,501

SUBMERGED RESISTOR INDUCTION FURNACE

Luther W. Bahney, Elizabeth, N. J., and Alfred H. Horswell, Jackson Heights, N. Y., assignors to Scovill Manufacturing Company, Waterbury, Conn., a corporation of Connecticut Application May 3, 1946, Serial No. 666,984

2 Claims. (Cl. 13—29)

The present invention relates to a furnace for melting metals, particularly to such a furnace of the electrical induction type wherein a plurality of loop channels are provided and the metal therein constitutes the secondary of a transformer through which electrical energy is supplied for the melting of the metal within the furnace.

An object of the invention is to provide such a furnace of large capacity wherein the melting of metals may be carried on continuously under closely controlled conditions and metal may be charged into and discharged from the furnace without interruption of its operation and, when necessary, the channels of the induction heating units may be cleared of obstructions and each entire induction heating unit may be removed and replaced without completely shutting down the furnace. A further object is to provide such a furnace particularly adapted for melting light metals such as aluminum and its alloys, or in fact any metal which tends to throw down slag or impurities or foreign matter tending to clog the channels of the induction units. These and other objects of the invention will be apparent from the following description of a preferred illustrative embodiment thereof.

The accompanying drawings show somewhat diagrammatically a furnace constructed in accordance with the present invention for the attainment of the objects of the invention. Therein:

Figure 1:
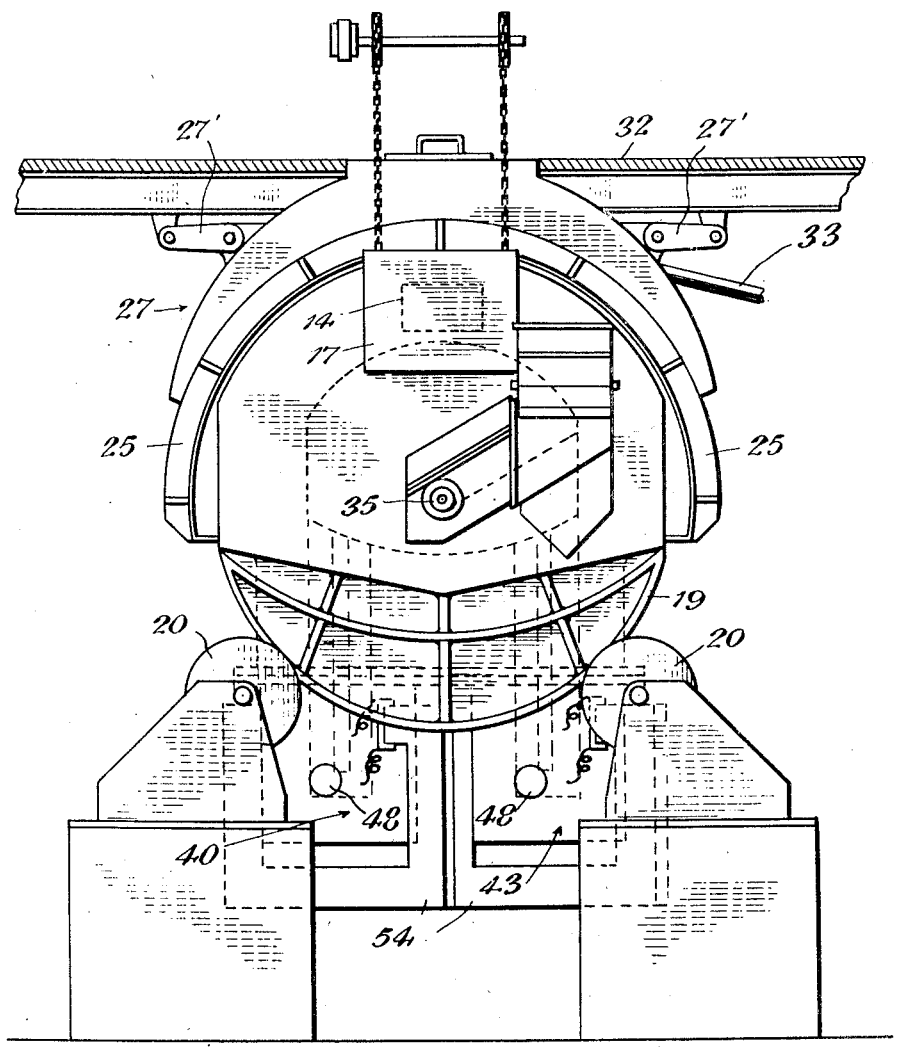
Figure 1 is a front elevation.

The present invention utilizes certain basic features of construction and operation disclosed in Summey Patent 2,102,582 and Tama Patent 2,339,964. Certain incidental features of construction used in connection with the furnace of the present invention are disclosed in Bahney and Horswell Patent 2,369,272. Reference may be had to said patents as a basis for an understanding of the improvements which constitute the present invention.

Referring to the drawings, it will be observed that the furnace of this invention comprises a closed horizontal hearth or chamber resembling in some respects the closed hearth of the Summey patent and the Bahney and Horswell patent. The furnace is mounted on rollers for oscillation about a horizontal axis, as shown in those patents, in order that the furnace may be tilted for pouring metal and for other reasons. The hearth or chamber of each of those patents is shown as cylindrical but in the present case the hearth has a semi-cylindrical dome or roof, vertical side walls and a curved bottom. It is of the same cross section throughout its length.

More particularly the furnace illustrated in the drawings comprises a substantial metal shell 10 lined with suitable refractory material 11 to form a melting chamber 12 extending from end to end of the furnace. The melting chamber is so located that the axis of oscillation of the furnace, indicated by the point A, will be well below the center of the chamber. Several openings are provided in the upper part of the lining and shell of the furnace for purposes to be described. A relatively large rectangular opening 13 is provided for charging the furnace. An opening 14 in the front wall permits access for other purposes. Another opening 15 in the front end wall connects with the pouring spout. A number of openings 16 in the roof of the furnace permit access for cleaning as will later be described. All openings are provided with suitable closures including the usual door 17 at the front of the furnace and the trap doors 18 for each of the openings 16. Mechanism for raising and lowering the door 17 is diagrammatically indicated.

The shell 10 of the furnace with all attached parts, is supported by two heavy end brackets 19 each having arcuate lower surfaces which rest upon a pair of rollers 20 journaled in suitable piers rising from the foundation upon which the furnace is mounted. Thus the furnace and all of its attachments may be oscillated about a fixed horizontal axis in the manner of the furnace shown in Summey Patent 2,102,582 and by mechanism of the character shown therein.

In order that the furnace may be charged through a fixed opening regardless of the position of the furnace during normal operation, a limited portion of the upper outer surface adjacent the opening 13 is shaped to conform to the surface of a cylinder having its center at the axis of oscillation of the furnace and a fixed saddle carrying the charging door, cooperates therewith.

Figure 2:
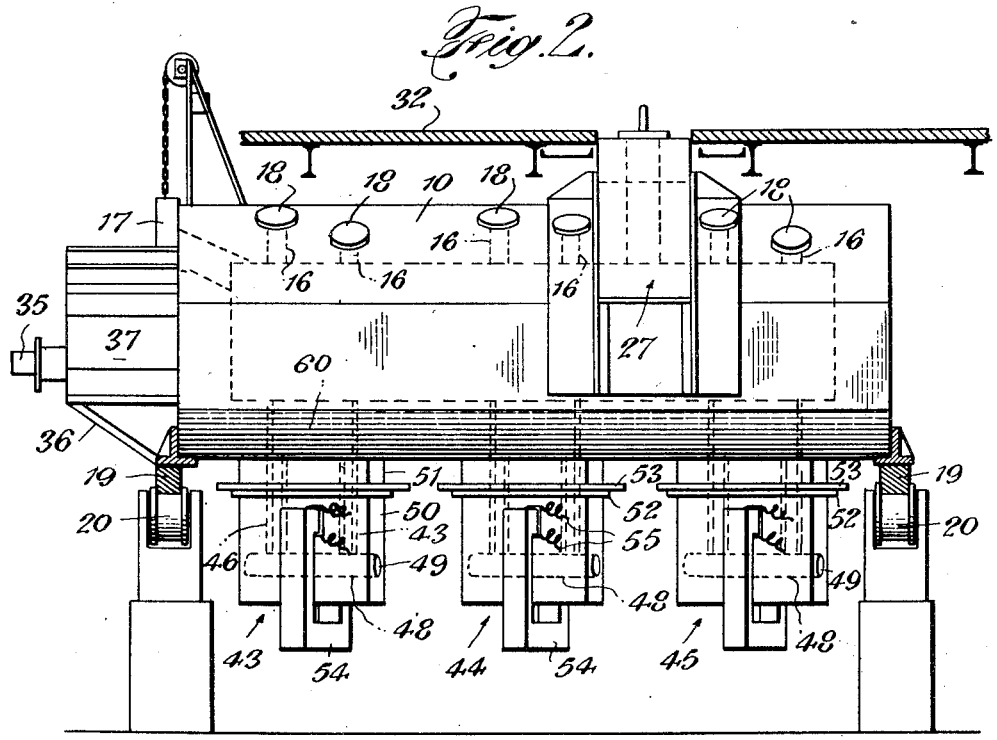
Figure 2 is a side elevation.
Figure 3:
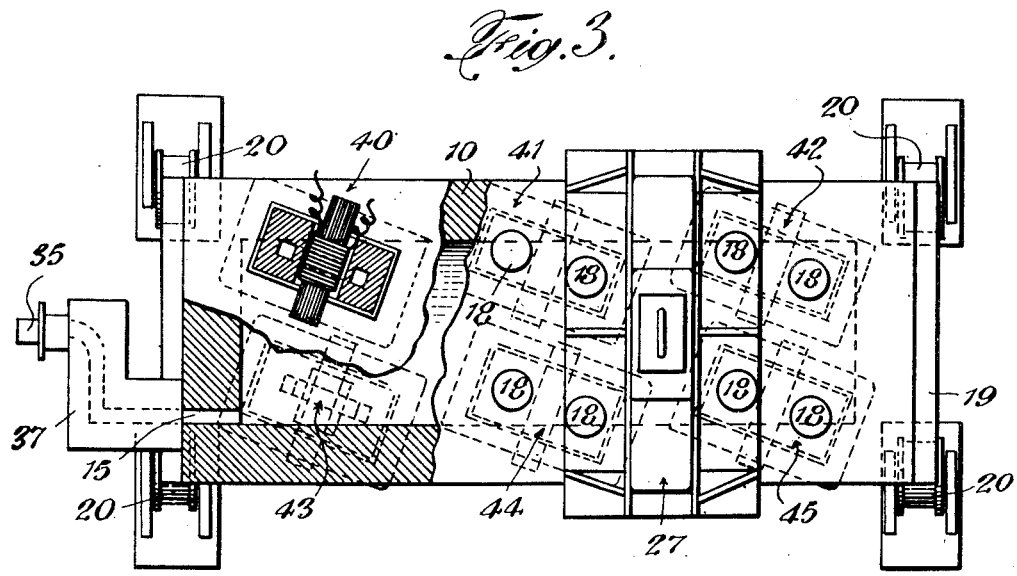
Figure 3 is a top plan view partly cut away.
Figure 4:
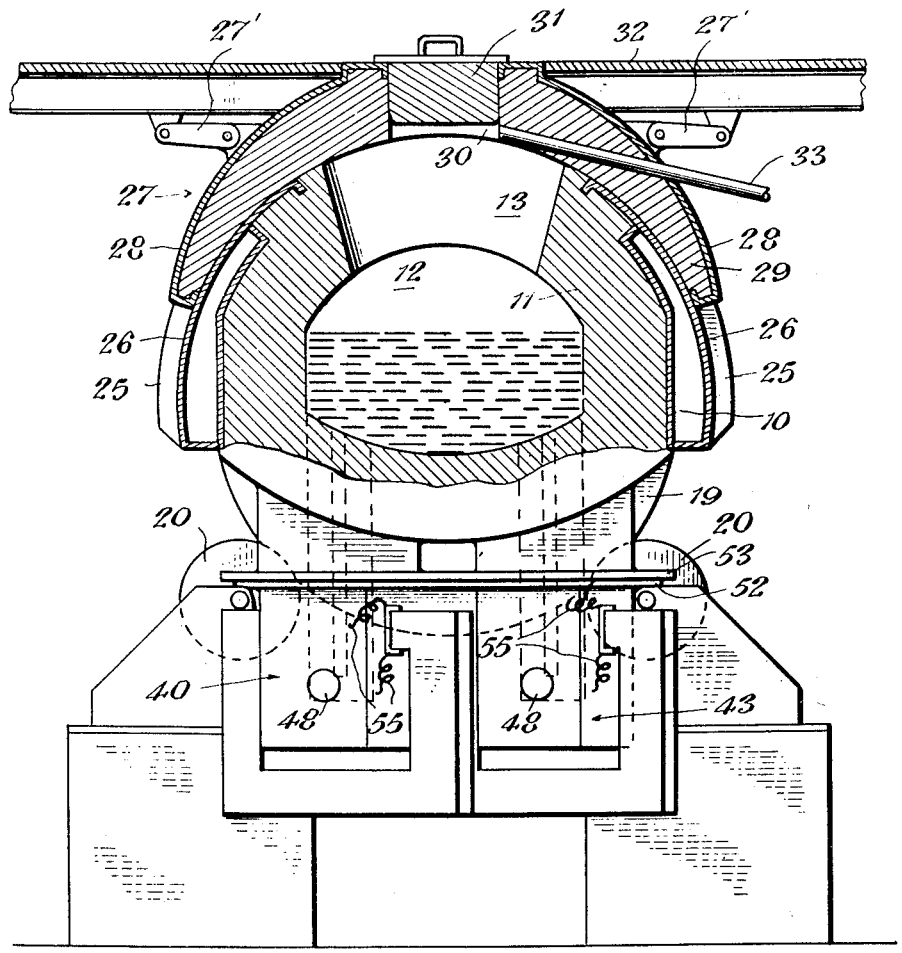
Figures 4, 5 and 6 are cross sectional views along the line X—X of Figures 2 and 3.

Referring to Figures 2 and 4, it will be seen that built-up guide members 25 are attached to the furnace shell and spaced from each other to form a cylindrical surface 26 slightly wider than the opening 13; the guides or rails extending downwardly on each side. A saddle 27 rests upon the surface 26 and has its underside shaped to conform thereto. The saddle 27 is suitably fashioned with a metal frame 28 lined on its underside with refractory material 29 and provided with a central opening 30 and a door 31 for said opening. The saddle 27 is intended to remain in fixed position and to that end is suitably attached by links 27' to the beams of the charging floor 32, thereby closing the opening 13 in the furnace at all times regardless of the position of the furnace and permitting the charging of the furnace through the fixed opening 30, although the furnace may be in any operating position either side of the vertical, shown in Figure 4, as for example in the extreme pouring position, shown in Figure 5 or even beyond that point as shown in Figure 6. The fixed position of the saddle 27 also permits it to be used for mounting a pipe 33 through which gases may be directed into the interior of the furnace if a controlled atmosphere therein is desired.

The saddle 27 with its charging door may be used advantageously with any closed hearth furnace mounted for limited rotation about a horizontal axis. Such an arrangement greatly facilitates the charging of the furnace in that it permits charging the furnace without regard to its position or movement occasioned by pouring or other operations.

It is advantageous in a furnace of this type to employ a pouring spout which will not vary its position during the tilting of the furnace to cause the discharge of molten metal therefrom. To this end a pouring spout of the type disclosed in Bahney and Horswell Patent 2,369,272 is used.

The opening 15 in the front end wall of the furnace connects with the pouring spout 35. It is located just above a horizontal plane through the furnace which defines the upper limit of molten metal therein when the furnace is in vertical position. Thus with the furnace in the position shown in Figure 4 and the metal level as indicated therein, no metal will flow through the passage or opening 15 but only when the furnace is rotated clockwise.

Under certain circumstances it may be desirable to accumulate in the furnace even more metal than is indicated in Figure 4. This may be accomplished by rotating the furnace counterclockwise, as viewed in that figure, thus raising the passage 15 to the pouring spout and permitting additional metal to be charged until the level of molten metal approaches the plane to which the opening 15 has been elevated.

The pouring spout 35 is mounted upon a suitable bracket 36 carried by the furnace shell and is located upon the axis of rotation of the furnace. It is connected with the passage 15 by a suitable launder 37 formed of refractory material and heated in the manner disclosed in Bahney and Horswell Patent 2,369,272.

A plurality of induction heating units 40 to 45 inclusive are arranged below and in communication with the main hearth or chamber 12. Each of these heating units resembles generally the single heating unit disclosed in Tama Patent 2,339,964, and each is detachable in the manner disclosed in Bahney and Horswell Patent 2,369,272 but with important differences as hereinafter described.

The several induction units are identical and a description of one will suffice. Each unit has preferably rectangular vertical channels 46 and 47 which are aligned with slots 60 extending downwardly through the floor of the hearth 12. Each unit also has a preferably cylindrical horizontal channel 48 connecting the two vertical channels at the bottom of the unit. Each lower channel 48 is provided with two clean-out doors or plugs 49. All of these channels are formed in suitable refractory material within the casing 50 of each unit and the slots 60 are formed in suitable refractory material within the casings 51 depending from the furnace shell. The adjectives "vertical" and "horizontal" as used in the specification and claims with reference to the channels of the induction units mean vertical and horizontal, as the case may be, when the furnace is in normal vertical position, as shown in Figures 1 and 4 of the drawings. The vertical channels are the two parallel channels extending downwardly from the floor of the hearth and the horizontal channel is the connecting channel at the bottoms of the parallel channels.

The casings 50 and 51 are provided with flanges 52, 53 respectively, so that each unit may be attached by suitable bolts to the furnace shell and may be removed selectively as occasion may require.

When metal fills the channels 46, 47 and 48 and a connected slot 60 it forms the secondary of a transformer. The primary of this transformer comprises a coil within the loop thus formed and surrounding one leg of a closed iron core 54. Leads 55 extend from the primary coil to a suitable source of low frequency alternating current. In accordance with usual practice the primary core may be so supported within and spaced from the refractory lining of the casing 50 as to allow a current of cooling air to be directed therethrough.

It will be observed that the induction heating units are so located along the underside of the furnace that with the furnace in normal vertical position, as shown in Figures 1 and 4, the channels 46, 47 and 48 and slots 60 will lie in parallel vertical planes, none of which coincides with the vertical plane passing through the axis of the furnace. In other words, each unit is set at an acute axial angle to the vertical plane of the furnace. This arrangement permits the spacing of the units reasonably close to each other and at the same time allows for direct access to each of the lower horizontal loop channels 48 after removal of its associated clean-out doors or plugs 49. It will also be observed that each vertical loop channel 46 or 47 is directly accessible through one or another of the openings 16 in the roof of the furnace after removal of the appropriate door 18.

The furnace herein described is particularly adapted for the melting of any metal which in the melting thereof is apt to throw down slag, dross or other impurities likely to collect in the channels of induction heating units. This is particularly true in the case of light metals such as aluminum. Moreover the present furnace is adapted for the melting of large quantities of such metal. For example, a furnace of the present construction may have a hearth measuring twenty feet in length, five and one-half feet in width, and three and one-quarter feet in height. When filled to normal operating capacity such furnace will hold about fourteen tons of aluminum or aluminum alloys or a greater tonnage of metals of higher specific gravity, for example thirty-six tons of zinc. In such a furnace the channels 46 and 47 of each transformer unit may be 4 x 4 inches in cross section and the round bottom channel 5 inches in diameter. The slots 60 may be 4 x 26 inches in cross section. Each transformer unit may be constructed to a rating of approximately 150 kw.

The various features of construction of the furnace herein described are of importance in connection with the operation of the furnace as will be apparent from a brief description thereof.

A furnace of this type must be carefully prepared for operation as, for example, by a sequence of steps which will now be described. Inasmuch as the lining of the casing 10 is in practice composed of fire brick backed by insulating brick and all bonded together with suitable refractory cements to form a solid mass, it must, before any metal can be introduced, be carefully dried out and preheated to avoid the formation of cracks or crevices. Preferably all heating units 40 to 45 are detached from the furnace during the drying out and preheating thereof. The drying and preheating may be accomplished in any suitable manner as, for example, by the burning of charcoal within the hearth to drive out moisture and then by the introduction of suitable oil burners through appropriate openings. In this manner the temperature of the lining may be brought up to about 800° C.

While the furnace itself is thus being dried out and preheated, the transformer units are being similarly dried out and preheated by the use of oil burners or by heating elements disposed in the channels.

The furnace may now be rotated counterclockwise about 30° and the heating units 43, 44 and 45 connected and power cables attached. Then the furnace may be rotated 60° clockwise into the position shown in Figure 6 so as to put the attached heating units in position for receiving liquid metal. During this operation an oil burner is kept in operation to maintain heat within the furnace.

The furnace may now be primed by pouring in liquid metal through the charging opening 30 with the aid of a suitable trough or launder. The liquid metal will flow into the furnace and into the channels of the heating units 43, 44 and 45. As soon as the liquid metal fills the channels of the heating units the power circuits should be closed in order to keep the charged metal molten within the channels and hearth.

Without moving the furnace the other three heating units 40, 41 and 42 may be attached and power cables connected. Then the furnace may be tilted back to the vertical mid position permitting the liquid metal to flow into the channels of the heating units 40, 41 and 42, whereupon the power circuits of those units should be closed. The oil burners may now be disconnected and withdrawn from the furnace. Thus the furnace is in position for operation with a minimum depth of metal.

As soon as the electrical units are functioning properly more liquid metal or solid ingots or slabs may be charged into the furnace through the charging opening 30 and the power input increased on all heating units to effect a melting of the newly charged metal which in normal operation may reach the level indicated in Figure 4.

In accordance with usual practice a thermocouple or thermocouples may be inserted in the lining of the furnace and connected with automatic control apparatus which will automatically regulate the electrical power input according to the temperature desired.

Figure 5:
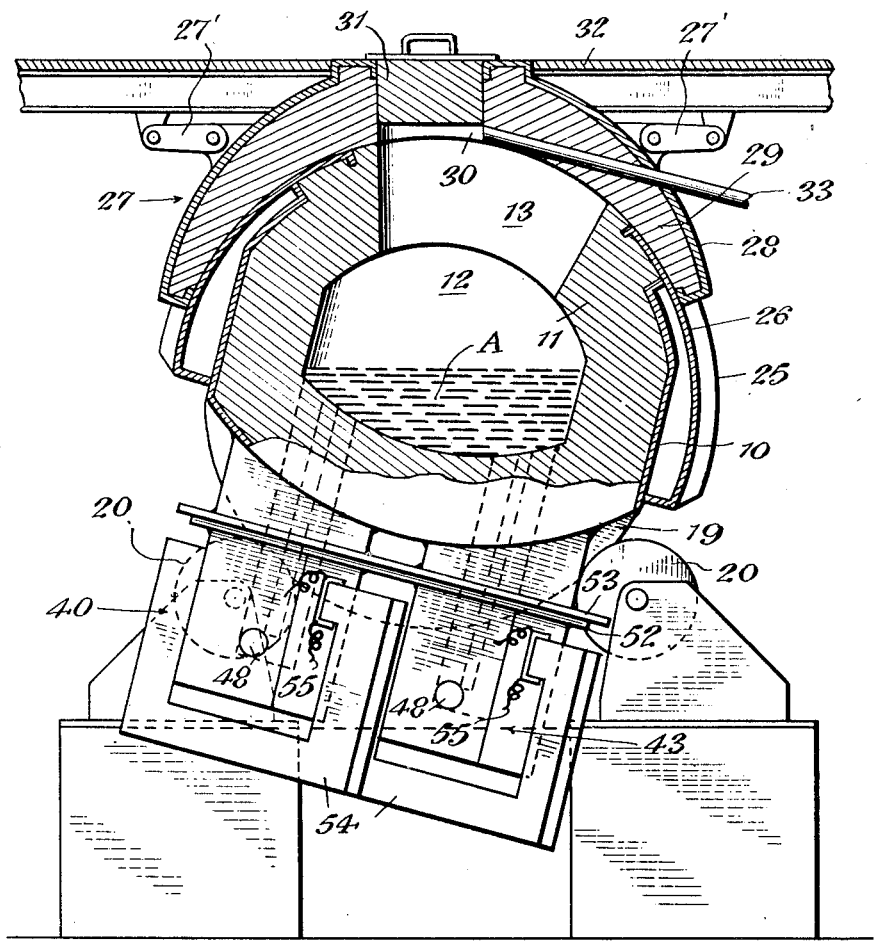
Figure 6:
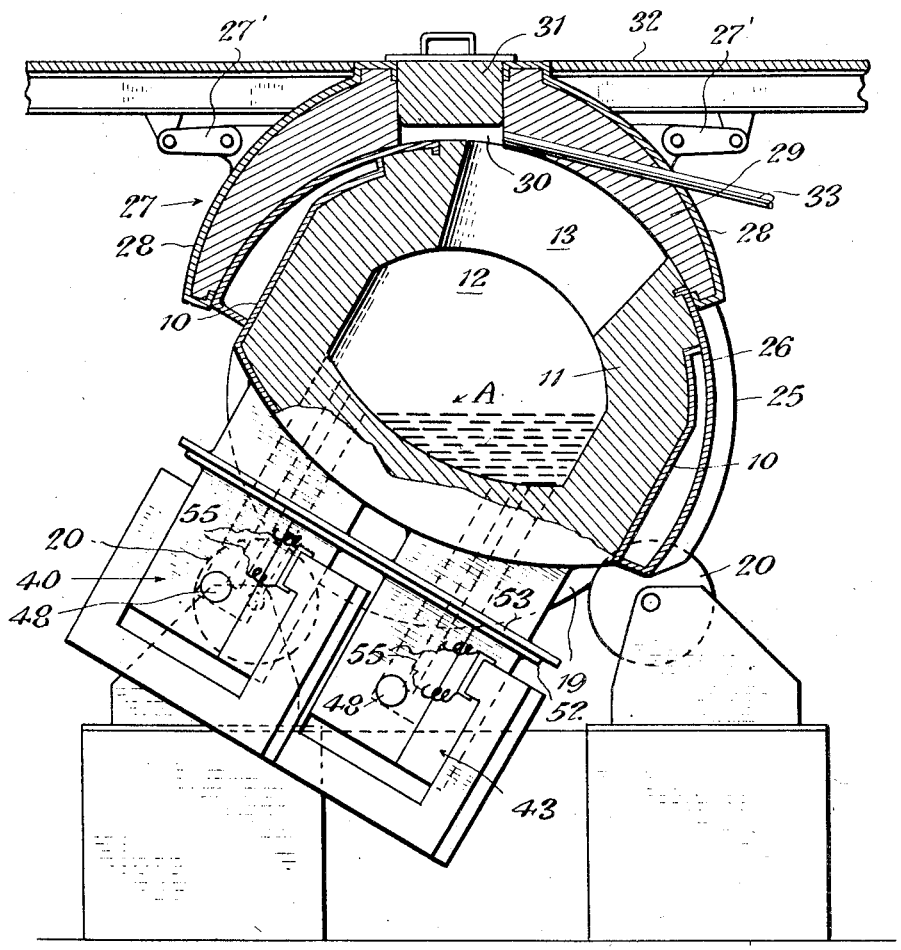

Pouring of metal is effected by tilting more or less to the right as indicated in Figure 5, which shows the extreme position for pouring with the metal level as low as it may be carried without rendering ineffective the heating units 40, 41 and 42. It will be observed that even in this extreme pouring position the charging door affords access to the interior of the furnace so that more metal may be added regardless of the pouring position.

In melting aluminum or other light metals or alloys, and in melting certain other heavier metals such as electrolytic zinc cathodes, the slag, dross or impurities tend to settle out and in this furnace will find their way down through the vertical transformer channels 46 and 47 into the lower channels 48. Such impurities may also adhere more or less to the sides of the vertical channels 46 and 47. Without shutting down the furnace, these vertical channels may be cleared of accumulations on their walls by the insertion of suitable tools through the openings 16 in the roof of the furnace, of which there is one such opening aligned with each vertical channel. When the accumulation of slag or dross or other impurities in the lower channels 48 has reached the point where the clearing of these channels is necessary, the furnace may be tilted to the extreme position, for instance to the right as shown in Figure 6, and the level of metal reduced so that it does not cover the openings of the slots leading to the channels of the units 40, 41 and 42. Thereupon the plugs 49 at the ends of each of the channels 48 in these units may be removed permitting some molten metal to escape. The channels 48 may be cleared of slag, the plugs restored and the furnace then rotated to the left from the position shown in Figure 6 so that molten metal will again fill the channels. For the cleaning of the lower channels 48 of the units 43, 44 and 45, a similar procedure may be followed except that the furnace will be rotated to the extreme left position opposite from that shown in Figure 6.

If the furnace is constructed for melting a metal under such conditions that slag, impurities or foreign matter accumulate on the surface of the molten metal and must be removed, then the opening 14 with its door 17 may be relocated to facilitate skimming operations or a skimming door may be located in the opposite end of the furnace.

After long periods of operation it may be necessary to change one or more of the induction heating units. Experience with this type of furnace indicates that a heating unit may fail although the hearth of the furnace shows little deterioration. When such replacement becomes necessary the metal level will be reduced by pouring and the furnace may be rotated in a direction to raise the heating unit which it is desired to replace, for example the heating unit 40 in Figure 6. A plug 49 is removed to withdraw metal from the channels of this unit. The fastenings holding the unit to the shell of the furnace are loosened and the unit removed. Another unit which has been suitably preheated is moved into place and attached. The channels of the new unit may now be filled with molten metal by rotating the furnace to its normal vertical position. The same procedure may be repeated with any other unit when it needs replacement.

Under certain conditions it may be desirable to operate the furnace with less than the full number of induction heating units. If such is the case the procedure outlined above may be followed and one or more units removed, whereupon the exposed transformer slot 60 is wholly or partially filled with refractory material and a simple cover plate fastened on to the shell of the furnace in place of the transformer unit.

During the change or cleaning of heating units as above described, the electrical circuits will, of course, be controlled in an appropriate manner.

The invention as herein described may be variously modified and embodied within the scope of the subjoined claims.

We claim as our invention:

1. A furnace for melting metals and alloys comprising, in combination, an enclosed hearth, means supporting said hearth for oscillation about a horizontal axis, two rows of electric induction heating units depending from and detachably secured to said hearth, one row on one side and one on the other side of the vertical axial plane of the hearth, and each of said heating units being provided with substantially vertical channels opening into the hearth and a horizontal channel connecting the bottoms of the vertical channels, and removable cleanout plugs at one end at least of each horizontal channel, the vertical and horizontal channels of the several heating units being located in parallel vertical planes, each forming an acute angle with the vertical axial plane of the hearth to permit direct access to the horizontal channels upon removal of the cleanout plugs.

2. A furnace according to claim 1, in which there are individual openings in the roof of the hearth in alignment with the vertical channels of the heating units so that each such channel is accessible from directly above for purposes of cleaning.

LUTHER W. BAHNEY.
ALFRED H. HORSWELL.

REFERENCES CITED

The following references are of record in the file of this patent:

UNITED STATES PATENTS

| Number | Name | Date |
|---|---|---|
| 1,040,994 | Bally | Oct. 15, 1912 |
| 1,444,584 | Clamer et al. | Feb. 6, 1923 |
| 1,687,937 | Greene | Oct. 16, 1928 |
| 1,851,575 | Greene | Mar. 29, 1932 |
| 1,920,380 | Greene | Aug. 1, 1933 |
| 1,924,200 | Schuffer | Aug. 29, 1933 |
| 2,065,691 | Hanson et al. | Dec. 29, 1936 |
| 2,102,582 | Summey | Dec. 14, 1937 |
| 2,339,964 | Tama | Jan. 25, 1944 |
| 2,369,272 | Bahney et al. | Feb. 13, 1945 |
| 2,427,817 | Tama | Sept. 23, 1947 |

FOREIGN PATENTS

| Number | Country | Date |
|---|---|---|
| 6,433 | Great Britain | of 1915 |
| 548,737 | Great Britain | Oct. 22, 1942 |
| 503,129 | Great Britain | Mar. 31, 1939 |
| 224,499 | Switzerland | Mar. 1, 1943 |